(12) United States Patent
He et al.

(10) Patent No.: US 10,566,758 B2
(45) Date of Patent: Feb. 18, 2020

(54) FIBER LASER OSCILLATOR HAVING THIN FILTER REFLECTOR

(71) Applicant: Advanced Optoware Corporation, Ronkonkoma, NY (US)

(72) Inventors: Chun He, Fremont, CA (US); Xiaojie Zhao, Stony Brook, NY (US)

(73) Assignee: ADVANCED OPTOWAVE CORPORATION, Ronkokoma, NY (US)

( * ) Notice: Subject to any disclaimer, the term of this patent is extended or adjusted under 35 U.S.C. 154(b) by 227 days.

(21) Appl. No.: 14/756,849

(22) Filed: Oct. 21, 2015

(65) Prior Publication Data
US 2017/0117680 A1  Apr. 27, 2017

(51) Int. Cl.
| | |
|---|---|
| H01S 3/067 | (2006.01) |
| H01S 3/00 | (2006.01) |
| H01S 3/0941 | (2006.01) |
| H01S 3/08 | (2006.01) |
| H01S 3/094 | (2006.01) |
| H01S 3/11 | (2006.01) |

(52) U.S. Cl.
CPC ............ *H01S 3/067* (2013.01); *H01S 3/0014* (2013.01); *H01S 3/0078* (2013.01); *H01S 3/08059* (2013.01); *H01S 3/0941* (2013.01); *H01S 3/094053* (2013.01); *H01S 3/1115* (2013.01)

(58) Field of Classification Search
CPC . H01S 3/067; H01S 3/06754; G02B 19/0052; G02F 2001/3528; G02F 1/3517; G02F 1/3558; G02F 1/365; G02F 2203/56
See application file for complete search history.

(56) References Cited

U.S. PATENT DOCUMENTS

| | | | |
|---|---|---|---|
| 4,780,877 A | 10/1988 | Snitzer | |
| 6,400,867 B1 * | 6/2002 | Liu | G02B 6/2937 34/60 |
| 6,529,317 B2 | 3/2003 | Choi et al. | |
| 6,574,393 B2 * | 6/2003 | Gao | C03B 37/01211 385/24 |

(Continued)

OTHER PUBLICATIONS

S. H. Seong, S. W. Ryu, H. J. Ko and J. S. Kim, "Characterization of External Cavity Laser with Thin Film Narrow Bandpass Filter," 2007 9th International Conference on Transparent Optical Networks, Rome, 2007, pp. 237-239. doi: 10.1109/ICTON.2007. 4296388.*

*Primary Examiner* — Ryan A Lepisto
*Assistant Examiner* — Erin D Chiem
(74) *Attorney, Agent, or Firm* — Suganda Jutamulia

(57) ABSTRACT

A fiber laser oscillator comprises an active fiber for providing a lasing light having a selected wavelength band, a saturable absorber assembly coupled to a first end of the active fiber, a pump source for providing a pump light having wavelengths except the selected wavelength band, an optical component coupled to the second end of the active fiber and the pump source. The optical component comprises a thin film filter for transmitting the lasing light for a first time and reflecting the pump light and a reflector for reflecting the lasing light transmitted for the first time through the thin film filter. The lasing light reflected by the reflector transmits through the thin film filter for a second time and overlaps with the pump light reflected by the thin film filter.

15 Claims, 7 Drawing Sheets

(56) References Cited

U.S. PATENT DOCUMENTS

| | | | |
|---|---|---|---|
| 7,542,639 B2 | 6/2009 | Moser et al. | |
| 7,616,668 B2 | 11/2009 | Ahn et al. | |
| 2010/0296529 A1* | 11/2010 | Andersen | H01S 3/067 372/6 |
| 2010/0322626 A1* | 12/2010 | Kim | G02B 6/2937 398/63 |

* cited by examiner

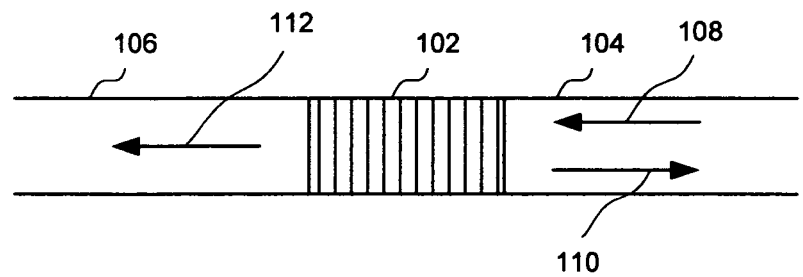
PRIOR ART                         FIG. 1
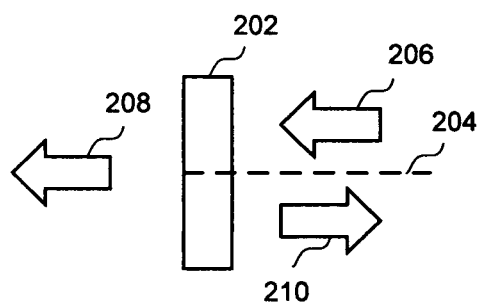 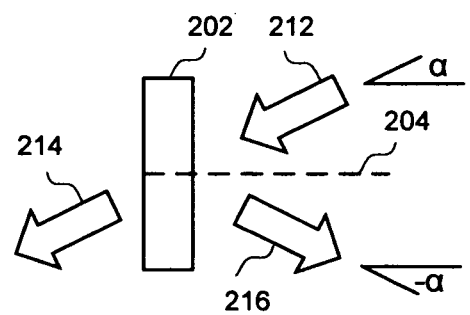
PRIOR ART                    PRIOR ART
FIG. 2A                        FIG. 2B

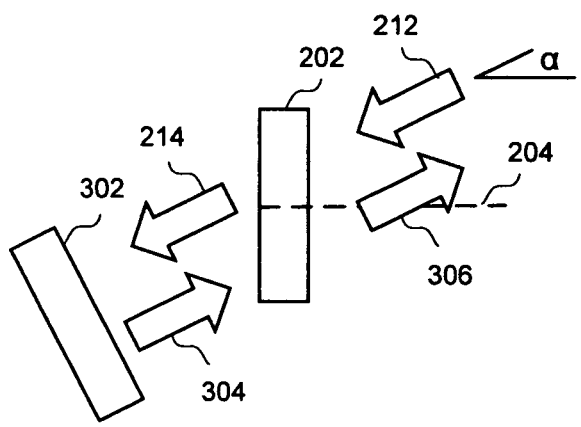
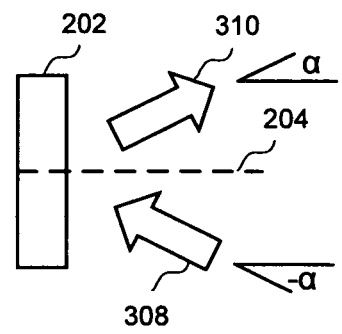
FIG. 3A  FIG. 3B
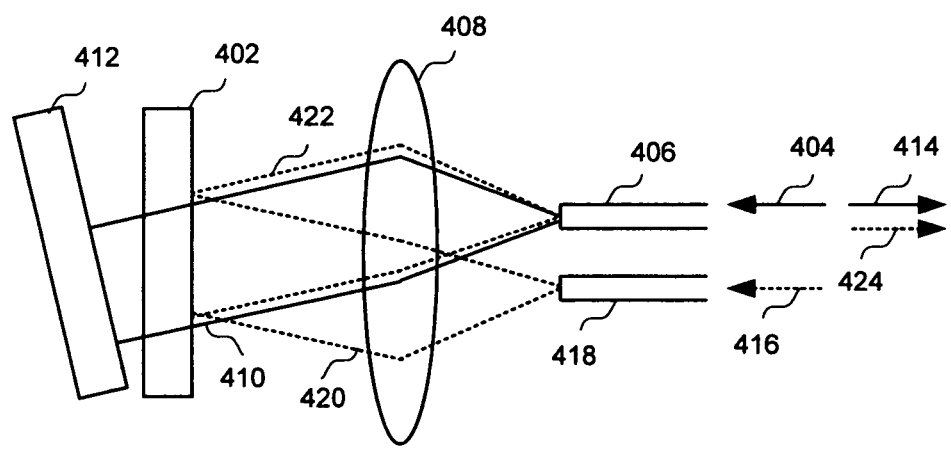
FIG. 4

FIBER LASER OSCILLATOR HAVING THIN FILTER REFLECTOR

FIELD OF THE INVENTION

This invention relates to fiber laser oscillators and more specifically to fiber laser oscillators having thin film filter reflectors.

BACKGROUND OF THE INVENTION

Ultrafast lasers, such as picosecond or femtosecond lasers, with pulse energy in micro joule (µJ) level are very desirable for many scientific studies and industrial applications. It is well known that the ultrafast laser can provide nano-scale dimension ablation without the detrimental thermal effect, facilitating the so called "cold" processes. This high peak power µJ pulse can also create a very strong electromagnetic field near the vicinity of the materials being machined, which offers an opportunity to practically verify many theoretical predictions of high electromagnetic field physics.

A high power fiber laser may comprise a fiber laser oscillator and multiple stages of fiber laser amplifiers. The fiber laser oscillator sets the laser's wavelength, pulse width, and repetition rate, while the fiber laser amplifiers boost the laser power to a required level. The fiber laser may optionally include a free space solid state power amplifier for a last stage power amplifying.

State of the art ultrafast lasers used in industrial applications are complex and expensive. The development focus in the commercial fiber laser industry is aimed at increasing the output power while reduced its manufacturing cost, i.e., to improve the current performance-over-cost ratio. Accordingly, less expensive high power ultrafast lasers are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 shows schematically a fiber Bragg grating (FBG) disposed between a first fiber and a second fiber.

FIG. 2A shows schematically a thin film filter (TFF).

FIG. 2B shows schematically incident light having a plurality of wavelength bands is incident onto a TFF with an incident angle α.

FIG. 3A shows schematically an arrangement of TFF according to an embodiment of the present invention.

FIG. 3B shows schematically another arrangement of TFF according to an embodiment of the present invention.

FIG. 4 shows schematically yet another arrangement of TFF according to an embodiment of the present invention.

Figure 5:
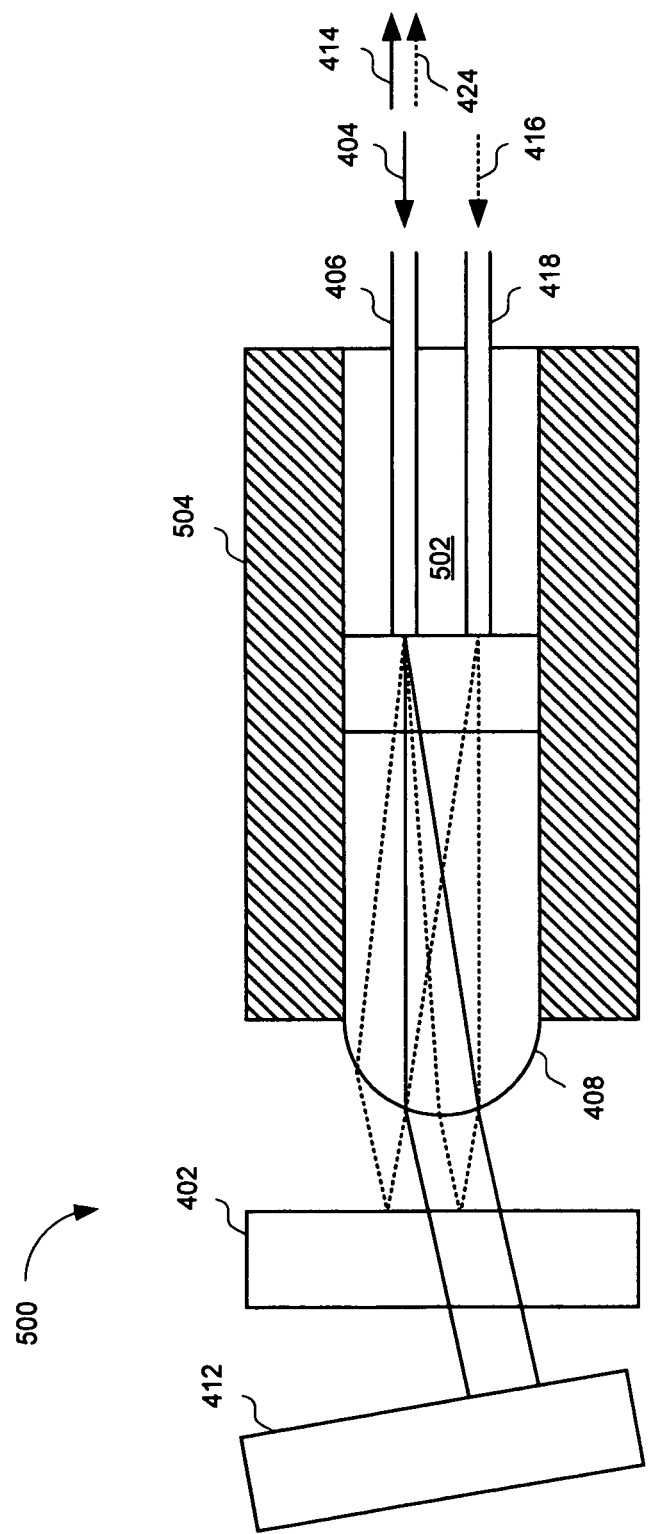
FIG. 5 shows schematically an optical component including a TFF according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

The high manufacturing cost of ultrafast lasers stems from the expansive fiber optic components used in constructing these lasers. A fiber Bragg grating (FBG) is a critical component that plays multiple functions for determining the laser's central wavelength and passband width, and being the laser's cavity end reflector. For extremely fast femtosecond pulses, the FBG also plays the role of dispersion compensation.

These functions generate many constraints on the design and manufacturing of the FBG, so that it is challenging to have the manufactured FBGs meet all the requirements simultaneously. Often, several rounds of manufacturing iterations are needed to make a finally acceptable FBG for fiber laser oscillator. In addition, the FBGs are manufactured by a process that using laser writing though a phase mask. This process can only produce a single FBG at each run time.

FIG. 1 shows schematically a FBG 102 disposed between a first fiber 104 and a second fiber 106. Incident light 108 having a plurality of wavelength bands propagates in first fiber 104 towards FBG 102. Light 110 having a selected wavelength band is reflected by FBG 102 propagating backward in first fiber 104. Light 112 having the rest of wavelength bands excluding the selected reflected wavelength band transmits through FBG 102 propagating forward in second fiber 106.

FIG. 2A shows schematically a thin film filter (TFF) 202 with a normal 204. Similar to FGB 102, incident light 206 having a plurality of wavelength bands propagates towards TFF 202. Transmitted light 208 having a selected wavelength band transmits through TFF 202 propagating forward. Reflected light 210 having the rest of wavelength bands excluding the selected transmitted wavelength band is reflected from TFF 202 propagating backward. Incident light 206, transmitted light 208, and reflected light 210 are normal to TFF 202.

FIG. 2B shows schematically incident light 212 having a plurality of wavelength bands is incident onto TFF 202 with normal 204 and has an incident angle α. Transmitted light 214 having a selected wavelength band transmits through TFF 202 propagating forward. Reflected light 216 having the rest of wavelength bands excluding the selected transmitted wavelength band is reflected from TFF 202 with a reflection angle −α. TFF 202 may be optimized and/or specially fabricated for incident angle α.

FIG. 3A shows schematically an arrangement of TFF 202 with normal 204 according to an embodiment of the present invention. Incident light 212 having a plurality of wavelength bands is incident onto TFF 202 with normal 204 and has an incident angle α. Transmitted light 214 having a selected wavelength band transmits through TFF 202 propagating forward with the same direction. Transmitted light 214 is reflected by a reflector or mirror 302 perpendicular to transmitted light 214 becoming light 304. Light 304 propagates in reversed direction of transmitted light 214. Light 304 transmits through TFF 202 becoming light 306. Light 306 having the selected wavelength band propagates in reversed direction of incident light 212.

FIG. 3B shows schematically another arrangement of TFF 202 with normal 204 according to an embodiment of the present invention. Incident light 308 having a plurality of wavelength bands is incident onto TFF 202 with normal 204 and has an incident angle −α. Reflected light 310 having the rest of wavelength bands excluding a selected transmitted wavelength band is reflected from TFF 202 with a reflection angle α. Reflected light 310 can be combined with light 306 of FIG. 3A having the selected wavelength band. In this manner, two light beams having different wavelength bands may be combined.

FIG. 4 shows schematically yet another arrangement of TFF 402 according to an embodiment of the present invention. First incident light 404 having a first wavelength band λ1 propagates in a first fiber 406. First incident light 404 coming from first fiber 406 is collimated by a lens 408 becoming a first collimated beam 410. First collimated beam 410 transmits through TFF 402 for the first time and then is reflected by a reflector 412 to reverse its direction. The reversed first collimated beam 410 transmits through TFF 402 for the second time and then is focused by lens 408 onto first fiber 406, becoming light 414 propagating in first fiber 406 in a direction opposite to the direction of first incident light 404.

Second incident light 416 having a second wavelength band λ2 different from first wavelength band λ1 or a plurality of wavelength bands excluding first wavelength band λ1, propagates in a second fiber 418. Second incident light 416 coming from second fiber 418 is collimated by lens 408 becoming a second collimated beam 420. Second collimated beam 420 is reflected by TFF 402 becoming a third collimated beam 422. Third collimated beam 422 is focused by lens 408 onto first fiber 406, becoming light 424 propagating in first fiber 406 in a direction opposite to the direction of first incident light 404.

Third collimated beam 422 overlaps with the reversed first collimated beam 410. They are together focused by lens 408 onto first fiber 406. In this manner, first incident light 404 having first wavelength band λ1 coming from first fiber 406 is combined with second incident light 416 having second wavelength band λ2 coming from second fiber 416. TFF 402 transmits light having first wavelength band λ1 and reflects light having other wavelength bands.

The combined first incident light 404 of λ1 and second incident light 416 of λ2 are focused by lens 408 onto first fiber 406, and propagate in first fiber 406 in the reversed direction of first incident light 402. It is appreciated that second incident light 416 may have a plurality of wavelength bands excluding first wavelength band λ1.

FIG. 5 shows schematically an optical component 500 according to an embodiment of the present invention. Optical component 500 is similar to the arrangement of TFF of FIG. 4. For brevity, detailed descriptions of identical portions and functions are omitted. Optical component 500 comprises first fiber 406, second fiber 418, lens 408, TFF 402, and reflector 412. First fiber 406 and second fiber 418 are held in a ferrule 502. Lens 408 and ferrule 502 are held by a tube 504. First incident light 404 of λ1 from first fiber 406 and second incident light 416 of λ2 from second fiber 418 are reflected and combined by TFF 402 and reflector 412 to a reflected combined light comprising light 414 of λ1 and light 424 of λ2 propagating in first fiber 406 opposite to the direction of first incident light 404 in first fiber 406. First incident light 404 of λ1 in first fiber 406 may be from a laser cavity (not shown). Second incident light 416 of λ2 may be from a pump source (not shown). Reflected combined light comprising λ1 and λ2 in first fiber 406 may be reflected to the laser cavity (not shown).

Figure 6:
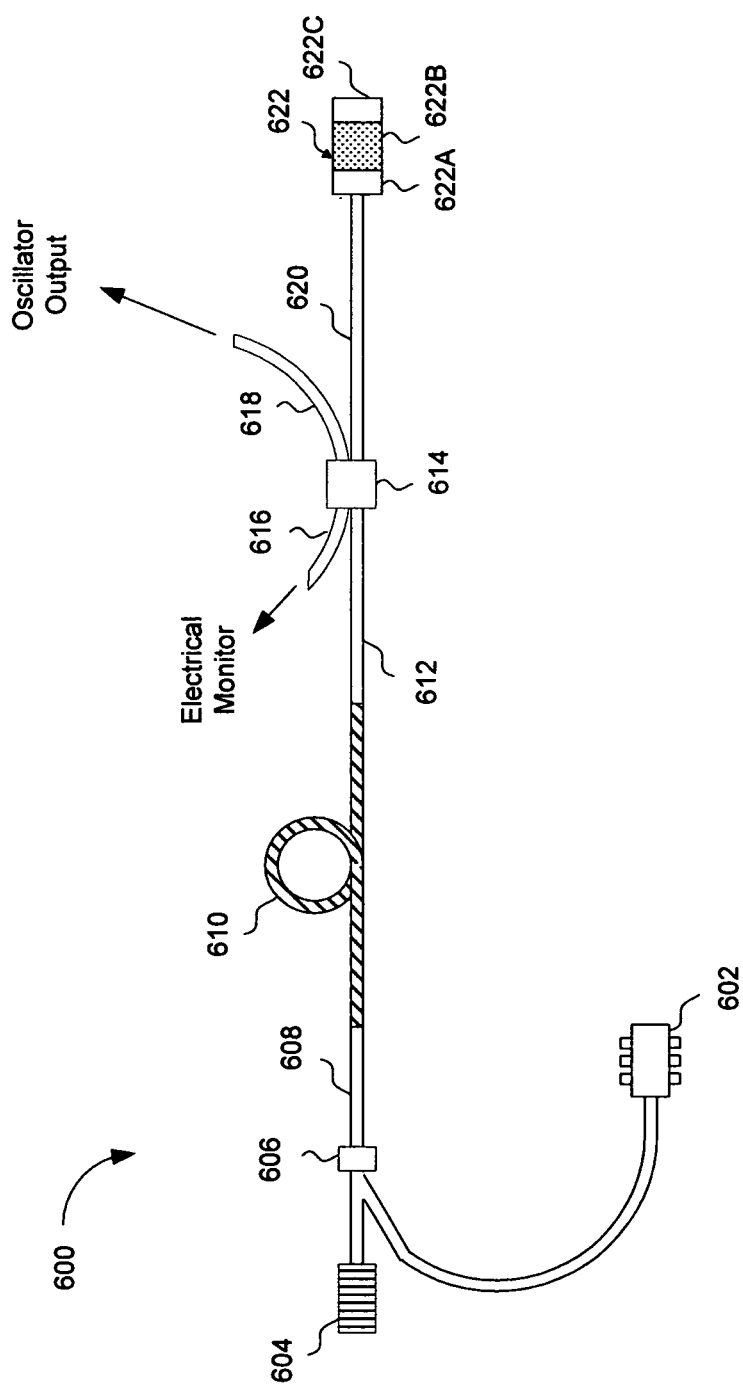
FIG. 6 shows schematically a conventional fiber laser oscillator.

FIG. 6 shows schematically a conventional fiber laser oscillator 600. Fiber laser oscillator 600 comprises a pump source 602, which may be a laser diode, a FBG 604 having a reflection wavelength band with a center wavelength that determines the lasing wavelength and with a reflection wavelength bandwidth that determines the laser pulse width, and a pump coupler 606, which may be a wavelength division multiplexing (WDM) filter comprising a TFF that couples the pump light from pump source 602 into a lasing media, which may be an active fiber 610. FBG 604 reflects lasing light back to active fiber 610, acting as an end reflector of a laser cavity comprising active fiber 610.

An end of active fiber 610 is coupled to beam coupler 606 by a passive fiber 608. Another end of active fiber is coupled to a power splitter 614 by a passive fiber 612. Power splitter 614 splits the lasing light in fiber 612 to fiber 616 for monitoring the power of the lasing light, to fiber 618 for delivering the output of fiber laser oscillator 600, and to fiber 620 for directing the lasing light to a saturable absorber assembly 622 comprising a fiber focuser 622A, a saturable absorber material (SAM) 622B to mode-lock the laser, and a mirror 622C. Saturable absorber assembly 622 acts as another end reflector of the laser cavity.

Figure 7:
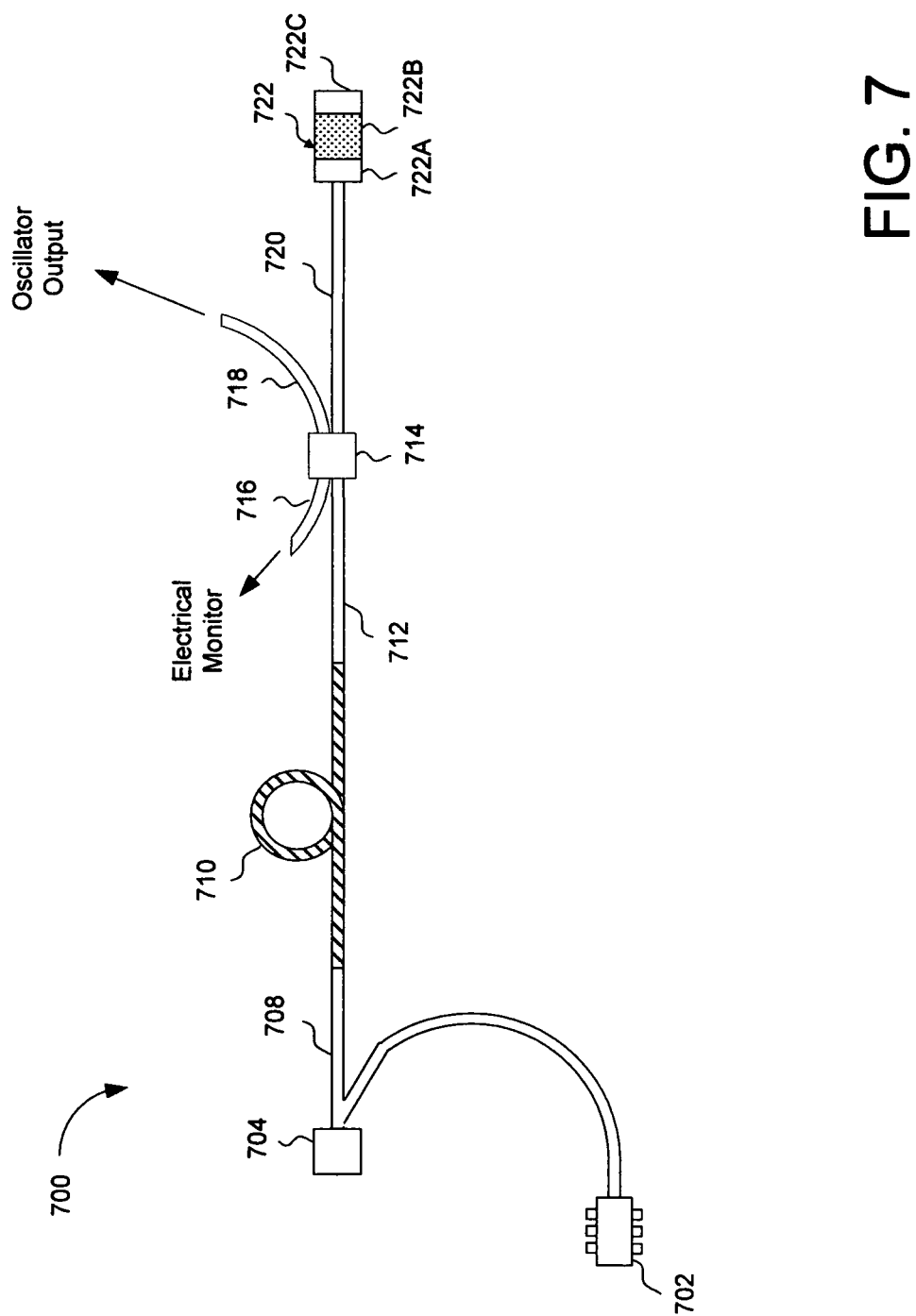
FIG. 7 shows schematically an exemplary fiber laser oscillator according to an embodiment of the present invention.

FIG. 7 shows schematically an exemplary fiber laser oscillator 700 according to an embodiment of the present invention. Fiber laser oscillator 700 comprises a pump source 702, which may be a laser diode, and an optical component 704 that determines the lasing wavelength and the laser pulse width. Optical component 704 also couples the pump light from pump source 702 into the lasing media. Note the pump light in FIG. 6 propagates toward active fiber 610, and the pump light in FIG. 7 propagates away from an active fiber 710.

An end of active fiber 710 is coupled to optical component 704 by a passive fiber 708. Similar to fiber laser oscillator 600 of FIG. 6, another end of active fiber is coupled to a saturable absorber assembly 722 by a power splitter 714 and a passive fiber 712. Power splitter 714 splits the lasing light in fiber 712 into a first branch 716 for monitoring the power of the lasing light, a second branch fiber 718 for delivering the output of fiber laser oscillator 700, and a third branch 720 for directing the lasing light to saturable absorber assembly 722 comprising a fiber focuser 722A, a saturable absorber material (SAM) 722B to mode-lock the laser, and a reflector 722C.

In contrast to conventional fiber laser oscillator 600 of FIG. 6, fiber laser oscillator 700 of FIG. 7 does not use FBR. Fiber laser oscillator 700 employs novel optical component 704 having the function of determining the laser's central wavelength and its bandwidth. At the same time, it also functions as the laser cavity end reflector. Furthermore, it also plays the role of coupling the pump light into the laser cavity, which is the same as provided by pump coupler 606 of FIG. 6. Thus, optical component 704 replaces both FBG 604 and pump coupler 606 of FIG. 6, simultaneously.

Optical component 704 comprises optical component 500 of FIG. 5. Refer to FIG. 5, first incident light 404 of $\lambda 1$ in first fiber 406 may be from the lasing media, which is active fiber 710. First fiber 406 may be passive fiber 708. Second incident light 416 of $\lambda 2$ in second fiber 418 may be from pump source 702. Second fiber 418 may couple to pump source 702. Reflected combined light comprising light 414 of $\lambda 1$ and light 424 of $\lambda 2$ propagating in first fiber 406 opposite to the direction of first incident light 404 in first fiber 406 may propagate toward active fiber 710. It is appreciated that reflected light 424 may have a plurality of wavelength bands excluding first wavelength band $\lambda 1$. However, second incident light 416 may include first wavelength band $\lambda 1$.

Refer back to FIG. 7, the pump light from pump source 702 having wavelength $\lambda 2$ is coupled by optical component 704 to passive fiber 708. The pump light of $\lambda 2$ is first directed to a TFF (e.g., TFF 402) in optical component 704 and then reflected by the TFF to passive fiber 708. The lasing light having wavelength $\lambda 1$ from active fiber 710 propagates in passive fiber 708 towards optical component 704. The lasing light of $\lambda 1$ is directed to the TFF. The lasing light of $\lambda 1$ transmits the TFF and then is reflected by a reflector (e.g., reflector 412) in optical component 704 to passive fiber 708. Thus, the pump light and lasing light are combined and propagate in passive fiber 708 towards active fiber 710. The pump light is absorbed by active fiber 710 to amplify the lasing light. The lasing light continues to propagate in passive fiber 712, and then split by power splitter 714 into first branch 716 toward an electrical monitor, second branch 718 for delivering output lasing light, and third branch 720 for directing the lasing light to saturable absorber assembly 722.

Saturable absorber assembly 722 comprises a fiber focuser 722A, a saturable absorber material (SAM) 722B to mode-lock the laser, and a mirror 722C. Only lasing light having the selected mode is reflected by saturable absorber assembly 722. The light absorption of SAM 722B decreases with increasing light. Since the lasing light of the selected mode has high intensity, it is not absorbed while light outside the selected mode will be absorbed. Lasing light transmits through SAM 722B is reflected by reflector 722C, passing through SAM 722B and fiber focuser 722A toward active fiber 710.

Figure 8:
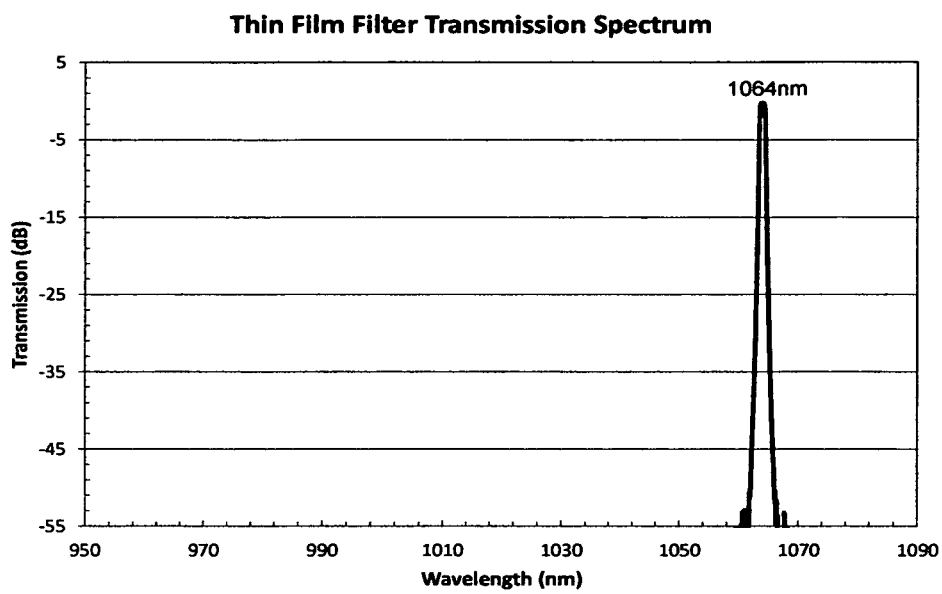
FIG. 8 shows an exemplary transmission curve of TFF of FIG. 5 according to an embodiment of the present invention.
Figure 9:
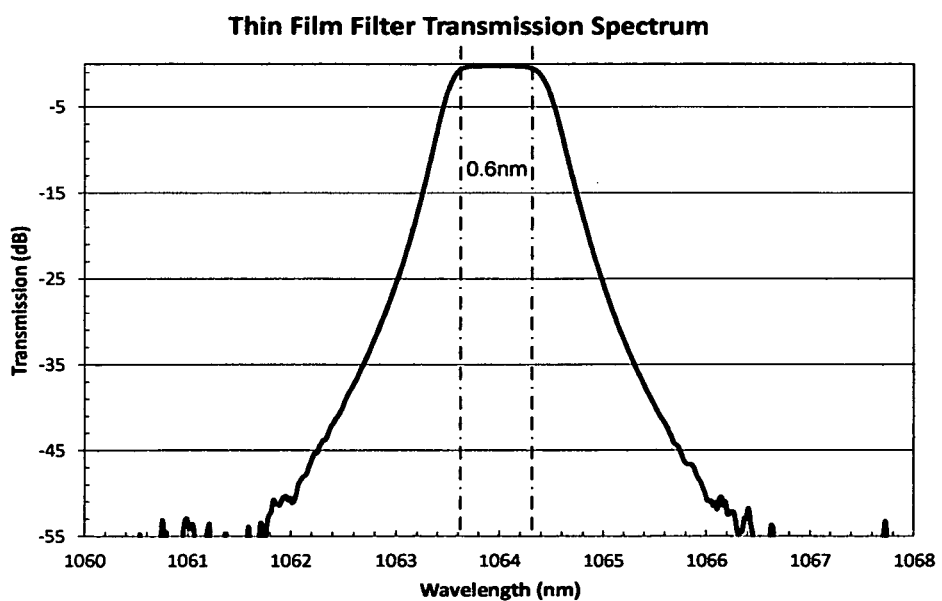
FIG. 9 shows the details in the vicinity of the transmission band of FIG. 8 according to an embodiment of the present invention.

FIG. 8 shows an exemplary transmission curve of TFF 402 of FIG. 5 according to an embodiment of the present invention. FIG. 9 shows the detail in the vicinity of the transmission band of FIG. 8 according to an embodiment of the present invention. The laser may have a lasing wavelength centered at 1064 nm and a full-width-half-maximum (FWHM) bandwidth of 0.6 nm measured at −3 dB. Fiber laser oscillator 700 of FIG. 7 may have a mode-locked lasing wavelength centered at 1064 nm and a pulse width of ~6 ps.

Figure 10:
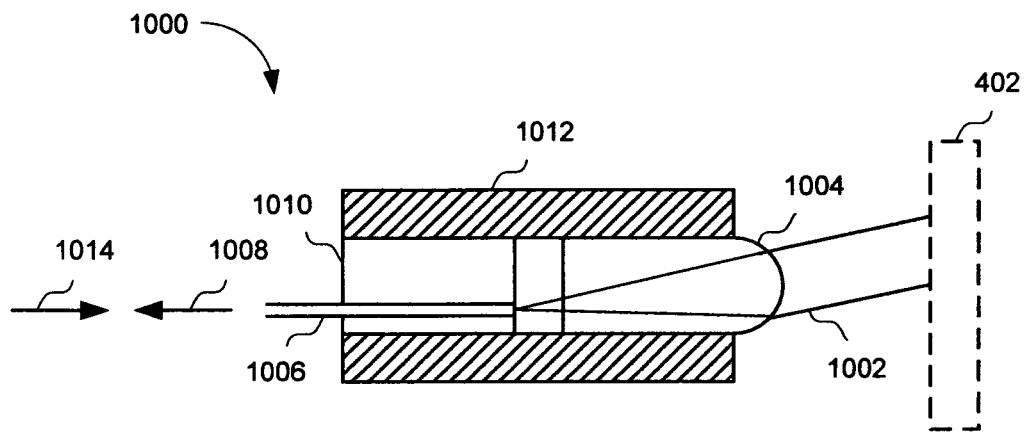
FIG. 10 shows a single fiber collimator replacing a mirror in optical component of FIG. 5, according to an embodiment of the present invention.

FIG. 10 shows a single fiber collimator 1000 and a reflector (not shown) may replace mirror 412 in optical component 500 of FIG. 5, according to an embodiment of the present invention. First incident light 1002 of 1 transmitted through TFF 402 is focused by a second lens 1004 onto a third fiber 1006, propagating in third fiber 1006 as an incident light 1008. Third fiber 1006 is held by a second ferrule 1010. Second ferrule 1010 and second lens 1004 are held by a second tube 1012 forming single fiber collimator 1000. A reflector at the end of third fiber 1006 (not shown) is configured to reflect incident light 1008 becoming a reflected light 1014 propagating in third fiber 1006 in a direction opposite to incident light 1008. Reflected light 1014 exits from third fiber 1006 and is collimated by second lens 1004. The collimated light transmits through TFF 402 along the same path of first incident light 1002 but in a reversed direction. After passing through TFF 402, the reflected light is focused by first lens 408 onto first fiber 406 as shown in optical component 500 of FIG. 5.

Figure 11:
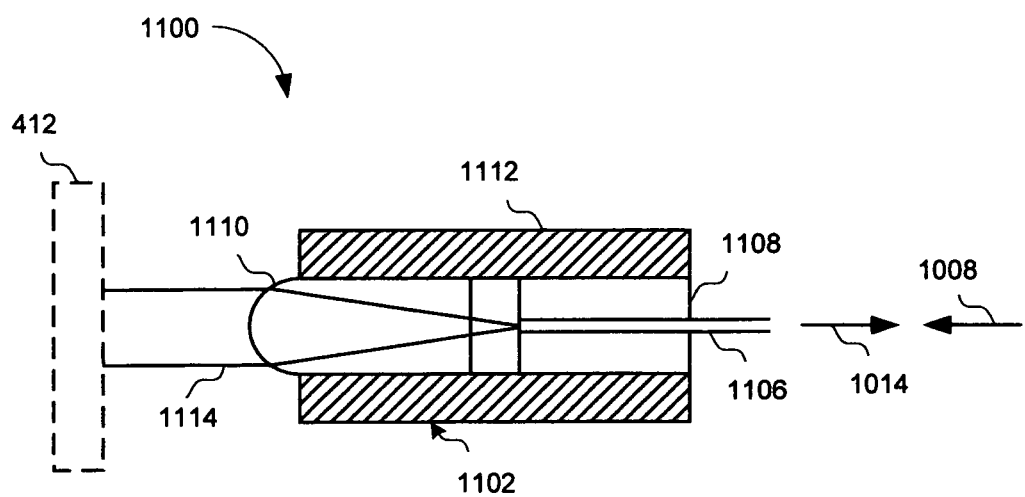
FIG. 11 shows an assembly comprising a single fiber collimator and a mirror for reflecting the incident light, according to an embodiment of the present invention.

Instead of using a reflector at the end of the fiber, FIG. 11 shows an assembly 1100 comprising a single fiber collimator 1102 and reflector 412 for reflecting the incident light, according to an embodiment of the present invention. Assembly 1100 may be coupled to single fiber collimator 1000 of FIG. 10 to reflect incident light 1008 becoming reflected light 1014 propagating in third fiber 1006 as shown in FIG. 10. A fourth fiber 1106, which is coupled to third fiber 1006 of FIG. 10, is held by a third ferrule 1108. Third ferrule 1108 and a third lens 1110 are held by a third tube 1112 forming single fiber collimator 1102. Incident light 1008 is collimated by third lens 1110 becoming collimated light 1114. Collimated light 1114 is reflected by reflector 412, then focused by third lens 1110 onto fourth fiber 1106, propagating in fourth fiber 1106 as reflected light 1014.

Fourth fiber 1106 is disposed at the center of third lens 1110. Consequently, collimated beam 1114 is parallel to the optical axis of third lens 1110. In contrast, third fiber 1006 in FIG. 10 is disposed off the center of second lens 1004, so the oblique collimated incident light 1002 can be focused onto third fiber 1006.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially. For the disclosed apparatuses, the order of elements may be changed while the operation principle is the same.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A fiber laser oscillator comprising:
an active fiber for providing a lasing light having a selected wavelength band;
a saturable absorber assembly coupled to a first end of the active fiber;
a pump source for providing a pump light;
an optical component coupled to a second end of the active fiber and the pump source;
wherein the optical component comprises:
a thin film filter for transmitting the lasing light having the selected wavelength band for a first time and reflecting the pump light having wavelengths except the selected wavelength band into the second end of the active fiber;
a first reflector for reflecting the lasing light transmitted for the first time through the thin film filter;
wherein the lasing light reflected by the first reflector transmits through the thin film filter for a second time and overlaps with the pump light reflected by the thin film filter.

2. The fiber laser oscillator of claim 1 wherein the optical component further comprises:
a first fiber for receiving the lasing light provided by the active fiber and providing a combined light of the lasing light reflected by the first reflector and the pump light reflected by the thin film filter;
a second fiber for receiving the pump light provided by the pump source;
a first ferrule for holding the first fiber and the second fiber;
a first lens for collimating light exiting from the first fiber and light exiting from the second fiber;
a first tube for holding the ferrule and the first lens;
wherein the first fiber and the second fiber are disposed symmetrically to an optical axis of the first lens.

3. The fiber laser oscillator of claim 2 wherein the optical component further comprises:
a third fiber for providing light to the first reflector;
a second ferrule for holding the third fiber;
a second lens for focusing the lasing light transmitted for the first time through the thin film filter;
a second tube for holding the second lens and the second ferrule;
wherein the third fiber is disposed off an optical axis of the second lens.

4. The fiber laser oscillator of claim 3 wherein the optical component further comprises:
a fourth fiber, wherein the fourth fiber is coupled to the third fiber;
a third ferrule for holding the fourth fiber;
a third lens for collimating light exiting from the fourth fiber;
a third tube for holding the third lens and the fourth fiber;
wherein light collimated by the third lens is reflected by the first reflector; and
wherein the fourth fiber is disposed on an optical axis of the third lens.

5. The fiber laser oscillator of claim 1 wherein the saturable absorber assembly comprises:
a fiber focuser;
a saturable absorber material for mode locking; and
a second reflector.

6. The fiber laser oscillator of claim 1 further comprising:
a power splitter disposed between the first end of the active fiber and the saturable absorber assembly;
wherein the power splitter splits the lasing light provided by the active fiber into a first branch for electrical monitoring, a second branch for delivering fiber laser oscillator output, and a third branch for directing the laser light to the saturable absorber assembly.

7. The fiber laser oscillator of claim 1 wherein the pump source is a laser diode.

8. An apparatus comprising:
a first fiber for receiving a lasing light having a selected wavelength band and providing a combined light of the lasing light and a pump light having wavelengths except the selected wavelength band;
a second fiber for receiving the pump light;
a first ferrule for holding the first fiber and the second fiber;
a first lens for collimating light exiting from the first fiber and light exiting from the second fiber;
a first tube for holding the first ferrule and the first lens;
a thin film filter for transmitting the lasing light having the selected wavelength band for a first time and reflecting the pump light having wavelengths except the selected wavelength band; and
a reflector for reflecting the lasing light transmitted for the first time through the thin film filter;
wherein the lasing light reflected by the reflector transmits through the thin film filter for a second time and overlaps with the pump light reflected by the thin film filter; and
wherein the first fiber and the second fiber are disposed symmetrically to an optical axis of the first lens.

9. The apparatus of claim 8 further comprising:
a third fiber for providing light to the reflector;
a second ferrule for holding the third fiber;
a second lens for focusing the lasing light transmitted for the first time through the thin film filter;
a second tube for holding the second lens and the second ferrule;
wherein the third fiber is disposed off an optical axis of the second lens.

10. The apparatus of claim 9 further comprising:
a fourth fiber, wherein the fourth fiber is coupled to the third fiber;
a third ferrule for holding the fourth fiber;
a third lens for collimating light exiting from the fourth fiber;
a third tube for holding the third lens and the fourth fiber;
wherein light collimated by the third lens is reflected by the reflector; and
wherein the fourth fiber is disposed on an optical axis of the third lens.

11. A method for combining a lasing light and a pump light comprising:
providing a lasing light having a selected wavelength band;
providing a pump light;
the lasing light having the selected wavelength band being transmitted by a thin film filter for a first time and the pump light having wavelengths except the selected wavelength band being reflected by the thin film filter;
the transmitted lasing light through the thin film filter for the first time being reflected by a reflector;
the reflected lasing light by the reflector being transmitted for a second time through the thin film filter;
the transmitted lasing light through the thin film filter for the second time overlapping with the pump light having wavelengths except the selected wavelength band reflected by the thin film filter.

12. The method for combining a lasing light and a pump light of claim 11 further comprising:
providing a first fiber for receiving the lasing light and providing a combined light of the lasing light and the pump light;
providing a second fiber for receiving the pump light;
providing a first ferrule for holding the first fiber and the second fiber;
providing a first lens for collimating light exiting from the first fiber and light exiting from the second fiber;
providing a first tube for holding the ferrule and the first lens;
wherein the first fiber and the second fiber are disposed symmetrically to an optical axis of the first lens.

13. The method for combining a lasing light and a pump light of claim 12 further comprising:
providing a third fiber for providing light to the reflector;
providing a second ferrule for holding the third fiber;
providing a second lens for focusing the lasing light transmitted for the first time through the thin film filter;
providing a second tube for holding the second lens and the second ferrule;
wherein the third fiber is disposed off an optical axis of the second lens.

14. The method for combining a lasing light and a pump light of claim 13 further comprising:
providing a fourth fiber, wherein the fourth fiber is coupled to the third fiber;
providing a third ferrule for holding the fourth fiber;
providing a third lens for collimating light exiting from the fourth fiber;
providing a third tube for holding the third lens and the fourth fiber;
wherein light collimated from the third lens is reflected by the reflector; and
wherein the fourth fiber is disposed on an optical axis of the third lens.

15. The method for combining a lasing light and a pump light of claim 11, wherein the pump light is provided by a laser diode.

* * * * *